United States Patent
Nicholas et al.

(10) Patent No.: US 10,047,800 B2
(45) Date of Patent: Aug. 14, 2018

(54) DRIVESHAFT WITH SINGLE CONSTANT-VELOCITY JOINT AND LOCKING MECHANISM

(71) Applicant: FORD GLOBAL TECHNOLOGIES, LLC, Dearborn, MI (US)

(72) Inventors: Chris Peter Nicholas, Milford, MI (US); Anthony Paskus, Rochester Hills, MI (US); Marc Thomas Wilkins, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 311 days.

(21) Appl. No.: 15/081,980

(22) Filed: Mar. 28, 2016

(65) Prior Publication Data

US 2017/0276181 A1 Sep. 28, 2017

(51) Int. Cl.
| | |
|---|---|
| *F16D 3/06* | (2006.01) |
| *B60K 17/344* | (2006.01) |
| *F16D 1/02* | (2006.01) |
| *F16D 3/84* | (2006.01) |
| *B60K 17/16* | (2006.01) |
| *F16D 1/05* | (2006.01) |
| *F16D 1/104* | (2006.01) |
| *F16D 3/223* | (2011.01) |

(52) U.S. Cl.
CPC ............. *F16D 3/06* (2013.01); *B60K 17/16* (2013.01); *B60K 17/344* (2013.01); *F16D 1/02* (2013.01); *F16D 1/05* (2013.01); *F16D 1/104* (2013.01); *F16D 3/223* (2013.01); *F16D 3/845* (2013.01)

(58) Field of Classification Search
CPC ...... F16D 3/06; F16D 1/02; F16D 1/05; F16D 1/104; B60K 17/344
See application file for complete search history.

(56) References Cited

U.S. PATENT DOCUMENTS

| | | | |
|---|---|---|---|
| 4,289,213 A | 9/1981 | Seaman | |
| 5,669,460 A | 9/1997 | Showalter | |
| 6,257,798 B1 * | 7/2001 | Wormsbaecher | ......... F16D 3/06 |
| | | | 403/357 |
| 7,252,616 B2 | 8/2007 | Wormsbaecher | |
| 8,256,328 B2 | 9/2012 | Stephens et al. | |
| 8,434,582 B2 * | 5/2013 | Bjorck | ..................... F16D 1/10 |
| | | | 180/383 |

(Continued)

FOREIGN PATENT DOCUMENTS

JP 2012017767 A 1/2012

*Primary Examiner* — Edwin A Young
(74) *Attorney, Agent, or Firm* — James Dottavio; Brooks Kushman P.C.

(57) ABSTRACT

A vehicle has a transfer case that is configured to receive power from a transmission, and transfer the power to one or both of a front axle and a rear axle. The transfer case has an output, such as an output rod, that delivers the power to a differential on one of the axles. A driveshaft has a single constant-velocity joint thereon. A first shaft of the driveshaft is directly connected to the output of the transfer case by a fixed connection, such as a spline connection, that inhibits axial slipping. The first shaft is connected on its other end to the constant-velocity joint. A second shaft of the driveshaft is connects to the constant-velocity joint to the differential. The driveshaft can also have a clamp at the splint to inhibit axial slipping at the spline connection.

15 Claims, 3 Drawing Sheets

(56) References Cited

U.S. PATENT DOCUMENTS

2007/0149298 A1* 6/2007 Wormsbaecher ....... F16D 3/845
464/145
2008/0099267 A1* 5/2008 Ruehle ................ B60K 17/344
180/233

* cited by examiner

DRIVESHAFT WITH SINGLE CONSTANT-VELOCITY JOINT AND LOCKING MECHANISM

TECHNICAL FIELD

The present disclosure relates to a driveshaft of a vehicle that transfers power from a transfer case toward a drive axle.

BACKGROUND

Four-wheel drive vehicles and all-wheel drive vehicles can provide driving power to both the front wheels and the rear wheels. Typically, this is made possible by way of a transfer case. The transfer case transfers rotational power from one power source (e.g., the engine) and splits the power between a shaft leading to the front axle and another shaft leading to the rear axle. The shaft leading to the front axle can be somewhat short, which requires precision and dedicated packaging efforts to assure the power is adequately sent to the front axle while maintaining spacing from other components.

SUMMARY

According to one embodiment, a vehicle includes a transfer case having an output and being configured to deliver torque from a transmission toward a differential. A driveshaft has a single constant-velocity joint. The driveshaft has a first shaft that is directly connected to the output by a fixed connection that inhibits axial slipping, and that is connected to the constant-velocity joint. The driveshaft also has a second shaft connecting the single constant-velocity joint to the differential.

In another embodiment, a vehicle has a first shaft, a second shaft, a constant-velocity joint coupled to the first and second shafts for transferring rotational speed therebetween, and a clamp. The first shaft has first spline connection features coupled to an output of a transfer case. The second shaft has second spline connection features coupled to an input of a differential. The clamp is disposed at least partially radially outward from the first spline features to inhibit axial slipping between the first shaft and the output.

In another embodiment, a vehicle has a transfer case having an output. A front-axle differential has an input. A first shaft is spline-connected to the output. A second shaft is spline-connected to the input. A constant-velocity joint is coupled to and between the first and second shafts.

According to multiple embodiments, only a single constant-velocity joint is provided between the transfer case and the differential.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Many factors are taken into consideration in designing and implementing the transfer of torque from the engine to the front wheels of a vehicle. For example, packaging and noise, vibration, and harshness (NVH) must be considered. Many current vehicles include relatively short driveshafts (or propshafts) that transfer rotational speed between a transfer case and a differential to the front wheels of a four-wheel drive or all-wheel drive vehicle. With increasing sizes or the sheer number of components at the front of the vehicle, the driveshaft may be required to take on high angles between rotating components at joints. This poses yet additional difficulty in packaging and NVH.

In general, this disclosure relates to a short-length driveshaft (or propshaft) and its connection at one end to a transfer case and at another end to a differential. The driveshaft can have a single constant-velocity joint (CV joint) between the transfer case and the differential to change the axis of rotation of regions of the driveshaft. The driveshaft can be connected to the differential via a slipping connection, such as a slip-spline connection, which enables axial slipping between the driveshaft and the input to the differential. In contrast, at the connection between the driveshaft and an output of the transfer case, there can be a locking mechanism to clamp or lock the driveshaft and output together. The driveshaft can be connected to the output of the transfer case via a spline connection. In that embodiment, the locking mechanism eliminates or inhibits spline wobble and backlash at the spline interface.

Figure 1:
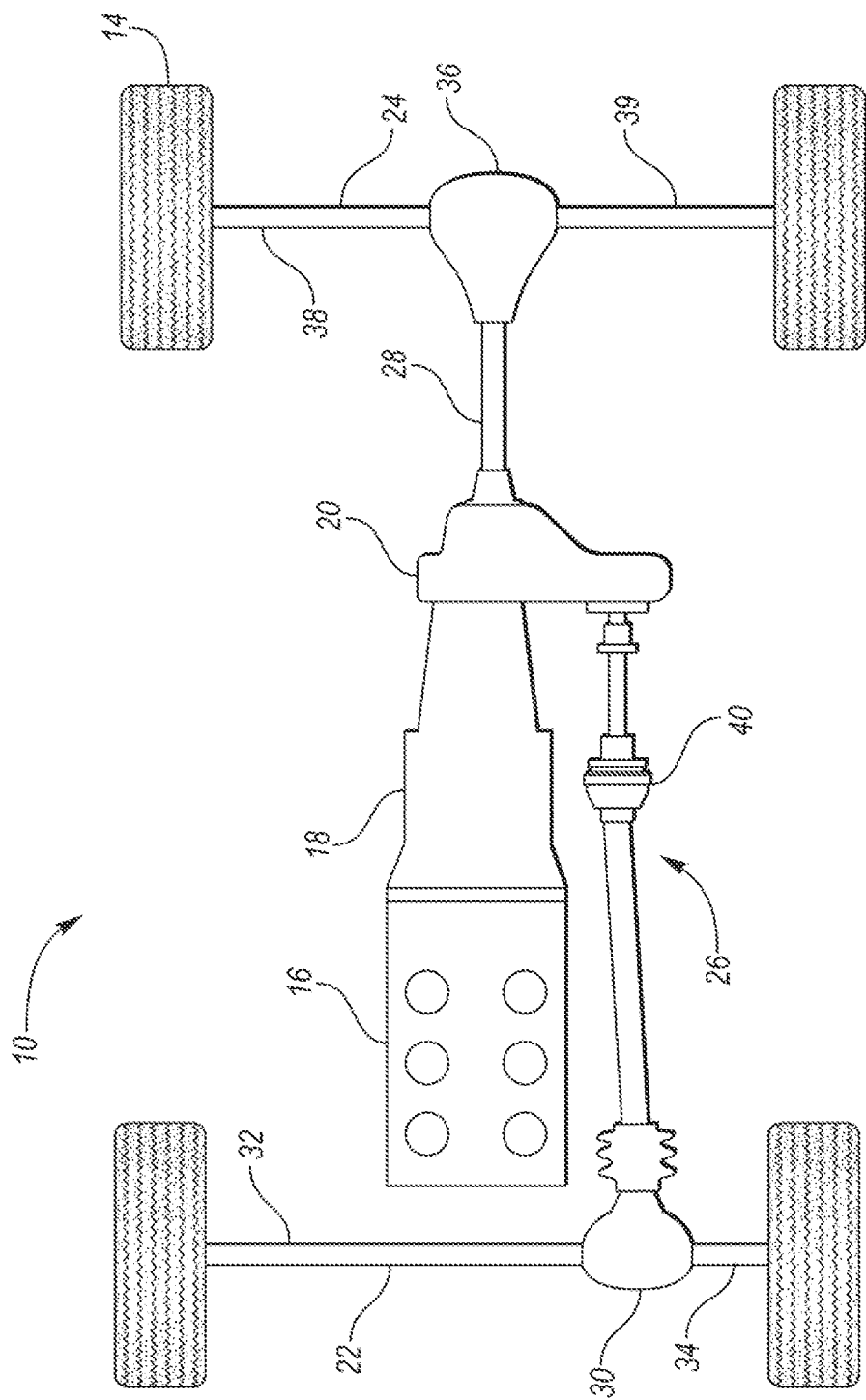
FIG. 1 is a schematic of a vehicle according to one embodiment of the present disclosure in which the vehicle includes a driveshaft connecting a transfer case to a front-axle differential.

Referring now to the drawings, FIG. 1 illustrates one example of a vehicle 10 according to this disclosure. The vehicle 10 is a four-wheel drive or all-wheel drive vehicle configured to send power to front wheels 12 and rear wheels 14. The vehicle 10 includes an engine 16, and a power transmission 18 for producing multiple forward speed ratios and reverse drive. A transfer case 20 receives rotational power from the transmission and transfers the power to one or both of a front axle 22 and a rear axle 24. The schematic in FIG. 1 is not intended to be limited, but merely exemplary to illustrate the context of certain components within an exemplary vehicle. For example, the vehicle can also include a torque converter that transmits engine power to the input of the transmission. The torque converter can be within the same housing of the transmission. For a manual transmission, a clutch can connect the engine to the transmission.

The transfer case 20 transfers power to the front axle 22 via a front driveshaft 26, and transfers power to the rear axle 24 via a rear driveshaft 28. The front driveshaft 26 transmits power to a front differential 30, which splits the power among axle shafts 32, 34. Similarly, the rear driveshaft 28 transmits power to a rear differential 36, which splits the power among axle shafts 38, 40. The transfer case 20 thus operates to receive power from the engine and simultaneously transfer power to both the front and rear axles and their respective wheels.

The front driveshaft 26 can include a constant-velocity joint (CV joint) 40. The CV joint 40 allows the front driveshaft 26 to transmit power through a variable angle at constant rotational speed, with little to no increase in friction or play. The constant-velocity joint can be a plunging tripod, a fixed tripod, a plunging ball joint, a fixed ball joint, or other types as known in the art.

Figure 2:
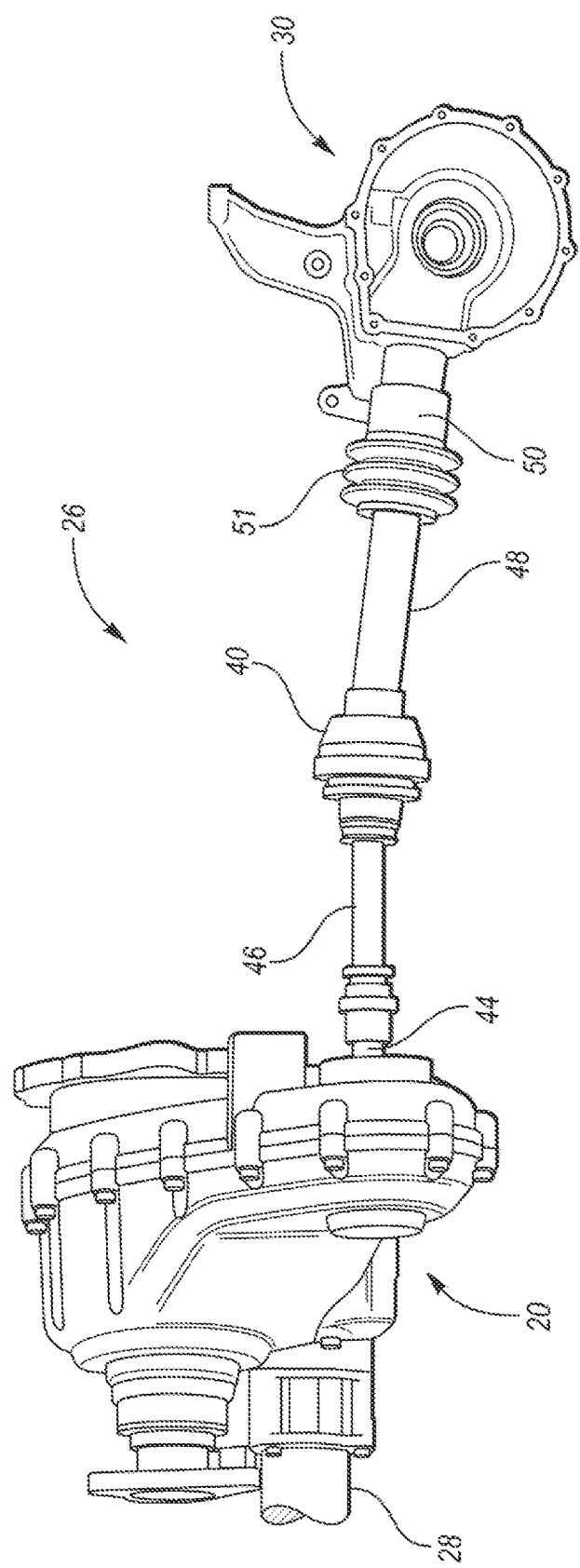
FIG. 2 is a side perspective view of the driveshaft of FIG. 1 between the transfer case and the differential, according to one embodiment.

FIG. 2 shows a more detailed view of the front driveshaft 26 between the transfer case 20 and the front differential 30. The front driveshaft 26 has an output 44 which coupled to a first shaft 46 of the driveshaft 26. In one embodiment, the first shaft 46 is coupled to the output 44 via a spline connection. Male spline connection features can be integrally formed onto an output shaft of the transfer case 20 either within the housing of the case 20 or partially extending outside of the housing. Corresponding female spline connection features can be integrally formed as part of the first shaft 26. The connection between the first shaft 46 and the transfer case is further described with reference to FIG. 3. As will be then described, this connection is fixed or clamped to prevent or inhibit any axial slipping during all driving conditions.

The first shaft 46 is connected to one side of the constant-velocity joint 40, which transfers rotational movement to a second shaft 48 connected to another side of the constant-velocity joint 40. The constant-velocity joint 40 enables the first shaft 46 and second shaft 48 to rotate with the same velocity while extending in different directions. In other words, the first shaft 46 extends along a first axis and the second shaft 48 extends along a second axis that intersects the first axis.

Figure 4:
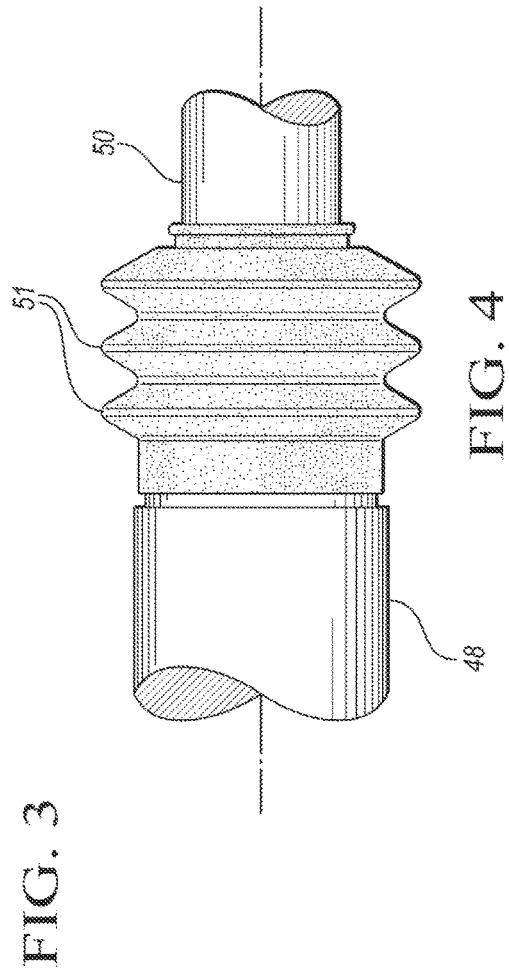
FIG. 4 is a side view of a connection between the driveshaft and the differential covered by a boot, according to one embodiment.

The second shaft 48 is connected to an input 50 of the differential 30 via a spline connection. Unlike the spline connection at the transfer case output, this spline connection at the differential can be a slip-spline connection, or any type of spline connection that enables or permits axial slipping while the vehicle is driving. No such clamp or locking mechanism is provided at the spline connection of the second shaft 48 and the differential input 50. The rear differential 30 and rear drive axle can thus move slightly axially (i.e., along the axis of the second shaft 48) to provide tolerance when moving. As shown in FIG. 4, the spline connection between the second shaft 48 and the input 50 can be covered by a boot 51 or seal to block external debris from interfering with the spline connection.

Figure 3:
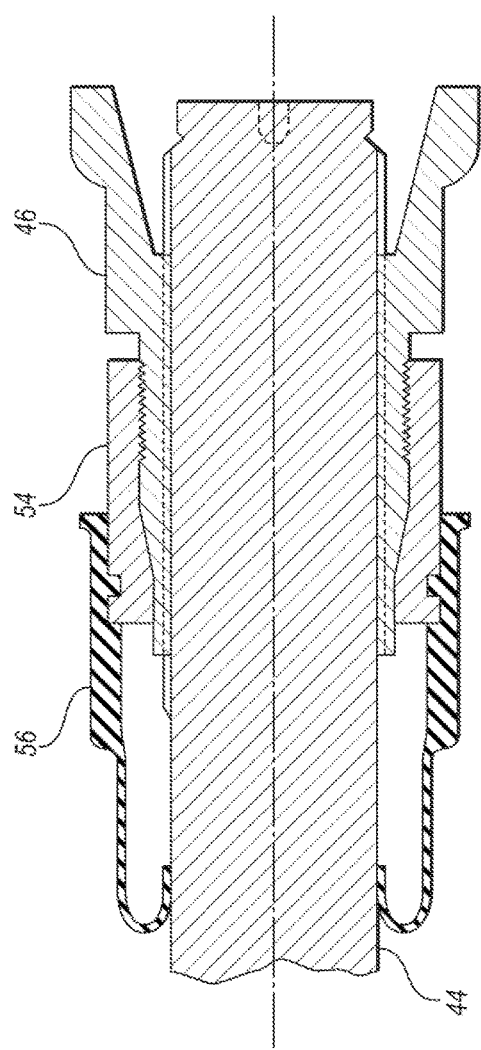
FIG. 3 is a cross-sectional view of a spline connection between an output of the transfer case and a first shaft of the driveshaft, according to one embodiment.

FIG. 3 shows a cross-sectional view of the spline connection between the output 44 of the transfer case and the first shaft 46. According to this embodiment, the first shaft 46 is disposed radially outward from the output shaft 44, although the design is not intended to be limited to such configuration. The male spline connection features can be integrally formed on the output shaft 44 to radially engage corresponding female spline connection features of the first shaft 46.

A holding device or locking mechanism 54 is also provided at the spline connection in FIG. 3. The locking member 54 is disposed radially outward from the first shaft 46 and directly connected to the output shaft 46 to provide a clamping force onto the first shaft 46. The force provided by the locking member 54 locks the shafts 44, 46 such that they rotate together while being inhibited from slipping axially relative to one another. In other words, a fixed connection is provided.

The locking mechanism 54 can be a collet or a lock collet nut. When tightened, the collet provides a clamping force about at least a majority of the circumference of first shaft 46 to press the shafts 44, 46, together. Other locking mechanisms 54 are contemplated and this disclosure is not necessarily limited to collets. For example, the locking mechanism 54 can include a weld yoke. Regardless of the type of locking mechanism, one skilled in the art should recognize that if a separate locking mechanism 54 is utilized to hold the shafts 44, 46 together, the locking mechanism should provide sufficient pressure to hold the shafts 44, 46 without enabling axial slipping. The locking mechanism 54 also allows the use of either a fixed or plunging (self-centering) CV joint assembly to be provided. A boot 56 can be placed about the shaft 44 and the locking mechanism 54.

This disclosure therefore provides a front driveshaft with a single constant-velocity joint and a locking mechanism between the driveshaft and the transfer case. A second constant-velocity joint is not necessary. This reduces weight and costs of the vehicle. This also makes assembly easier, as less components are required and only a tightening or clamping force is required at the connecting interface. The locking mechanism eliminates or inhibits spline wobble and backlash at the connecting interface.

Teachings of the present disclosure should not be limited to their exact arrangement disclosed. For example, it should be understood that the locking mechanism 54 can be provided at the interface between the second shaft 48 and the differential, while leaving the interface between the transfer case 20 and the first shaft 46 with a slip-enabled engagement.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:
1. A vehicle comprising:
   a transfer case having an output and being configured to deliver torque from a transmission toward a differential; and a driveshaft with a single constant-velocity joint, the driveshaft having
 a first shaft directly connected to the output by a fixed connection that inhibits axial slipping, and connected to the constant-velocity joint, and
 a second shaft connecting the constant-velocity joint to the differential;
wherein the first shaft is connected to the output via a spline connection, and wherein the driveshaft further includes a clamp at the spline connection configured to inhibit axial slipping at the spline connection.

2. The vehicle of claim 1, further comprising a weld yoke at the fixed connection.

3. The vehicle of claim 1, wherein the differential includes an input, and the second shaft is connected to the input via a spline connection.

4. The vehicle of claim 3, further comprising a boot disposed about the spline connection.

5. The vehicle of claim 3, wherein the spline connection includes female splines integrally formed in the second shaft and male splines integrally formed on the input of the differential.

6. A vehicle comprising:
 a first shaft having first spline connection features coupled to an output of a transfer case;
 a second shaft having second spline connection features coupled to an input of a differential;
 a constant-velocity joint coupled to the first and second shafts for transferring rotational speed therebetween; and
 a clamp disposed at least partially radially outward from the first spline features to inhibit axial slipping between the first shaft and the output.

7. The vehicle of claim 6, wherein the first spline connection features are disposed radially outward of the output shaft, and wherein the clamp is disposed about at least a portion of the first spline connection features.

8. The vehicle of claim 6, wherein the clamp is a collet.

9. The vehicle of claim 6, wherein the vehicle does not include a second constant-velocity joint between the transfer case and the differential.

10. The vehicle of claim 6, wherein the second spline connection features are unclamped with the input of the differential to permit axial slipping between the second shaft and the input.

11. The vehicle of claim 6, wherein the differential is a front-axle differential.

12. A vehicle comprising:
 a transfer case having an output;
 a front-axle differential having an input;
 a first shaft spline-connected to the output and disposed radially about a portion of the output;
 a second shaft spline-connected to the input;
 a constant-velocity joint coupled to and between the first and second shaft; and
 a collet disposed about a portion of the first shaft and configured to axially lock the first shaft to the output.

13. The vehicle of claim 12, wherein the output includes male spline connection features protruding outward therefrom that engage with female spline connection features integrally formed in the first shaft.

14. The vehicle of claim 12, wherein the second shaft is connected to the input via a slip spline connection that enables axial slipping.

15. The vehicle of claim 14, wherein the first shaft is connected to the output via a locked spline connection that inhibits axial slipping.

* * * * *